United States Patent [19]

Fimeri

[11] Patent Number: 4,867,409
[45] Date of Patent: * Sep. 19, 1989

[54] BREAKAWAY MIRRORS

[75] Inventor: Garry G. L. Fimeri, Lonsdale, Australia

[73] Assignee: Britax Rainsfords Pty. Ltd., Lonsdale, Australia

[*] Notice: The portion of the term of this patent subsequent to Jun. 6, 2006 has been disclaimed.

[21] Appl. No.: 190,014

[22] Filed: May 4, 1988

[30] Foreign Application Priority Data

May 4, 1987 [AU] Australia ................................ PI1724

[51] Int. Cl.$^4$ ................................................ B60R 1/06
[52] U.S. Cl. ........................................ 248/549; 248/481
[58] Field of Search .................... 248/549, 466, 475.1, 248/476, 479, 481, 482, 483, 484, 485, 486, 487, 288.3, 288.5, 900; 350/631, 632, 635, 636, 640

[56] References Cited

U.S. PATENT DOCUMENTS

| 4,422,724 | 12/1983 | Otsuka | 350/636 |
| 4,464,017 | 8/1984 | Wada | 350/632 |
| 4,548,483 | 10/1985 | Moro | 248/549 |
| 4,636,045 | 1/1987 | Suzuki | 350/632 |

FOREIGN PATENT DOCUMENTS

| 2436339 | 2/1976 | Fed. Rep. of Germany | 350/635 |
| 2829492 | 1/1980 | Fed. Rep. of Germany | 350/635 |
| 3605945 | 8/1987 | Fed. Rep. of Germany | 350/640 |
| 2405843 | 6/1979 | France | 350/635 |
| 7734 | 1/1982 | Japan | 350/635 |
| 22543 | 2/1985 | Japan | 350/632 |
| 76438 | 4/1985 | Japan | 350/632 |
| 53445 | 5/1985 | Japan | 350/632 |
| 1551 | 1/1986 | Japan | 350/632 |
| 2164617 | 3/1986 | United Kingdom | 350/632 |

Primary Examiner—J. Franklin Foss
Assistant Examiner—Robert A. Olson
Attorney, Agent, or Firm—Klauber & Jackson

[57] ABSTRACT

A breakaway rear vision mirror has a mounting base and a pivoted assembly. A control lever is pivoted to the base and coupled to a mirror backing plate which carries a mirror, which is adjusted for position by the lever.

The hinge between the mounting base and pivoted assembly is releasable, but held together by a spring which co-acts between the pivoted assembly and the lever, thereby applying a pressure which urges the lever into firm frictional contact with the mounting base and tends to retain the mirror in its set position.

4 Claims, 4 Drawing Sheets

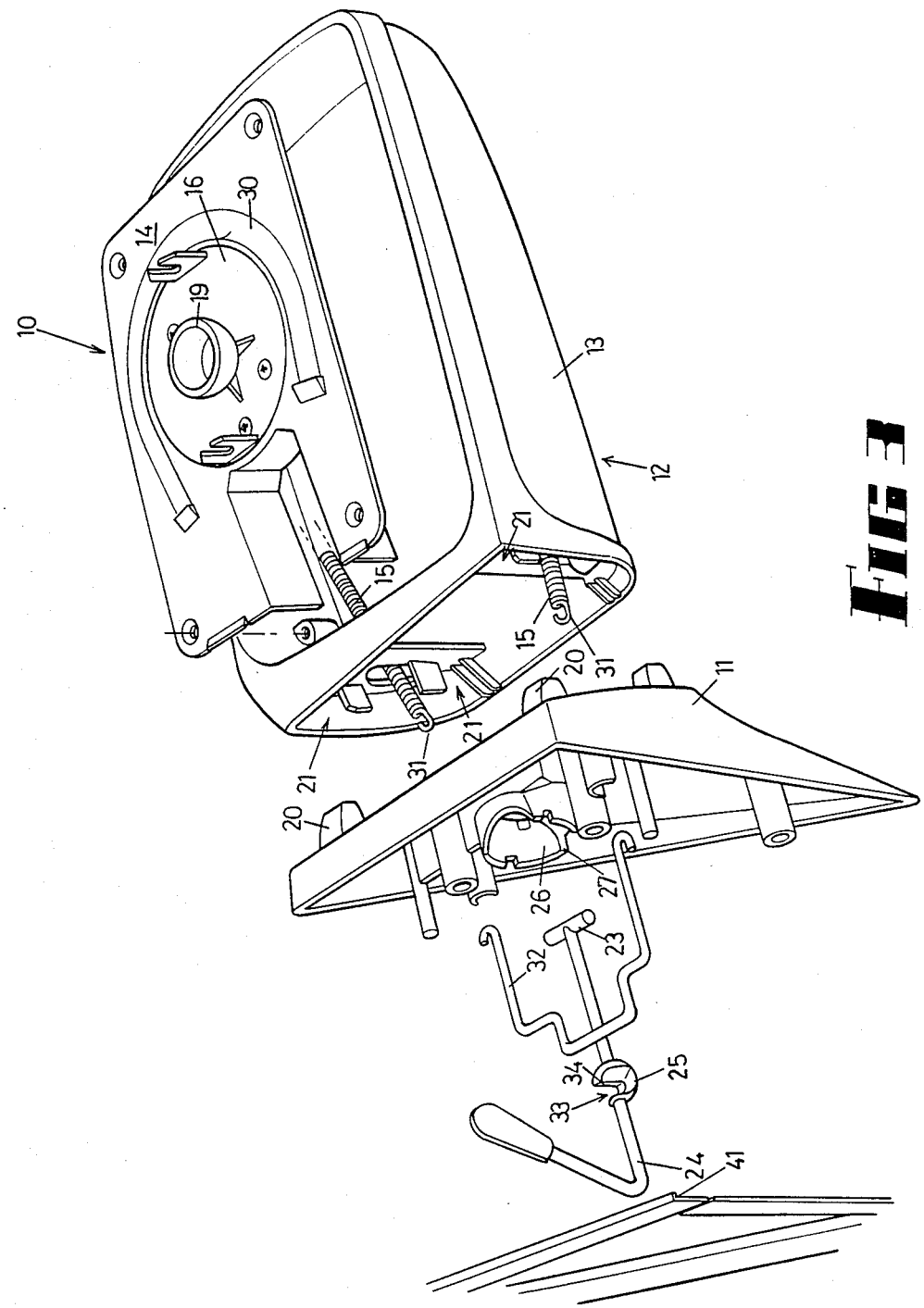

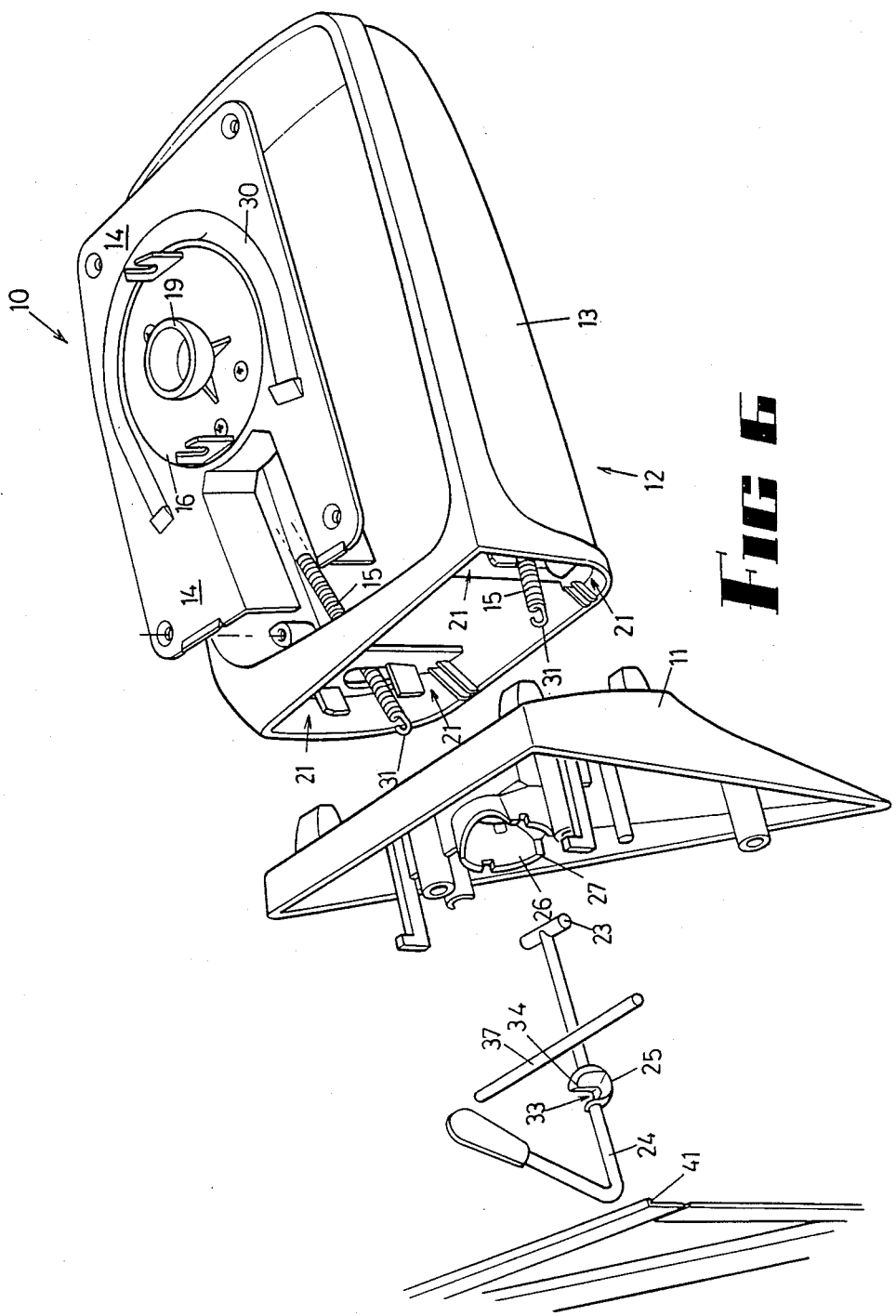

BREAKAWAY MIRRORS

This invention relates to improvements in and relating to the so-called "breakaway" rear vision mirror assemblies as used on vehicles, that is, mirrors which project outwardly from the side of the vehicle but which pivot either forwardly or rearwardly in the case of striking an obstruction.

BACKGROUND OF THE INVENTION

Outboard breakaway mirrors are mandatory in many countries, but heretofore the mechanism for retaining the mirror assembly to the mounting frame has been complex, and in certain instances has been such that complete resetting of the mirror is required after it has been deflected from its mounting frame. Furthermore, there is a tendency for a rear vision mirror to vibrate away from its set position.

The main object of this invention is to provide improvements which will simplify construction and manufacture, and which will effectively retain the mirror in its set position.

BRIEF SUMMARY OF THE INVENTION

In this invention a breakaway rear vision mirror has a mounting base and a pivoted assembly. A control lever is pivoted to the base and coupled to a mirror backing plate which carries a mirror, which is adjusted for position by the lever.

The hinge between the mounting base and pivoted assembly is releasable, but held together by a spring which co-acts between the pivoted assembly and the lever, thereby applying a pressure which urges the lever into firm frictional contact with the mounting base and tends to retain the mirror in its set position.

More specifically, a breakaway rear vision mirror according to this invention comprises a mounting base and a pivoted assembly, interengaging but releasable hinge means between the base and pivoted assembly, the mounting base comprising a tilt control lever movable with respect thereto, the pivoted assembly comprising a mirror, a mirror backing plate carrying the mirror being adjustable for position, and having means engaged by an end of the control lever to adjust the mirror position in response to control lever movement, and a spring so co-acting between the pivoted assembly and the control lever as to urge the hinge means into engagement.

With this arrangement, the spring can for example extend around a track in a spring plate carried in pivoted mirror assembly, and have two ends which engage a saddle carried by the lever. The spring then performs the dual function of urging the mirror assembly into engagement with the mounting frame, and also maintaining such pressure on the mount for the tilt control lever that additional friction means is not required. In turn, if additional friction means is not required, the mirror backing plate which carries the mirror itself, and which must be mounted for universal movement with respect to the swivel mount plate, can be a readily releasable member retained by resilient deformation of interengaging elements, but unlikely to be displaced because of the effect of the spring.

As said above, a difficulty which has been encountered with prior art mirror assemblies has been the need to effect a reassembly operation if the mirror assembly is deflected to its maximum amount with respect to the mounting frame.

In a further embodiment of this invention, the mirror backing plate is provided with a narrow mouth channel track of sufficient length to retain a T-head of the tilt control lever for the whole of the pivotal movement of the mirror assembly with respect to its mounting frame the track having retention means at its mouth so that accidental dislodgement is unlikely to occur.

While the invention need not necessarily include the abovementioned details, two embodiments are described hereunder in some further detail with reference to and are illustrated in the accompanying drawings in which:

FIG. 3 is a perspective view of the main elements of the invention, shown in "exploded" form for simplicity of understanding;

FIG. 6 is a view corresponding to FIG. 3 but showing a second embodiment.

In both embodiments similar elements bear similar designations, the main difference being in the saddle member which is generally U-shaped in the first embodiment but a straight rod in the second.

Figure 2:
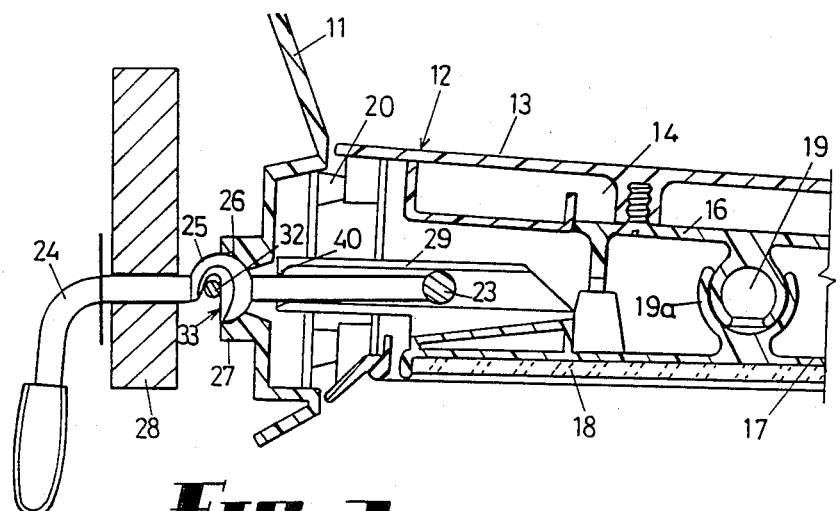
FIG. 2 is a part-section taken on the plane 2—2 of FIG. 1.
Figure 1:
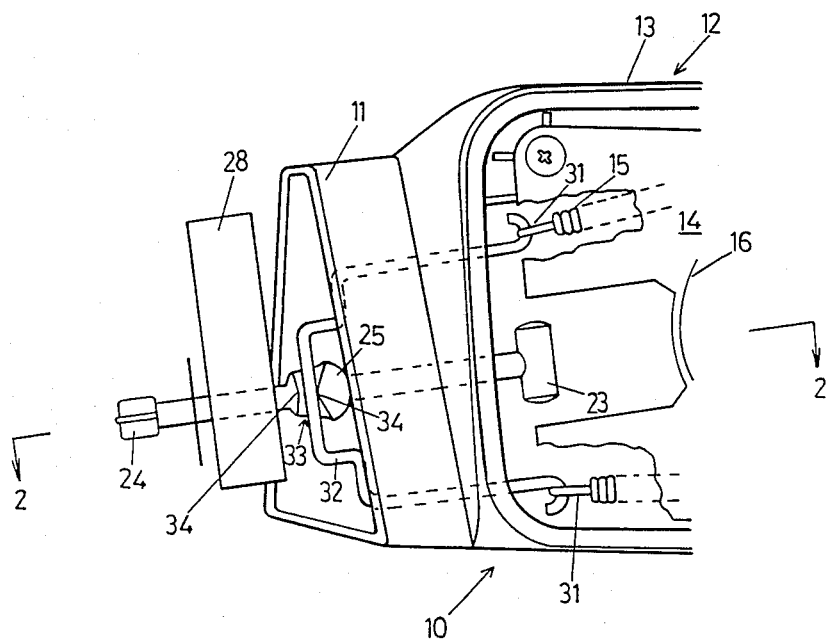
FIG. 1 is an elevational view of portion of a mirror assembly and mounting frame, but with the mirror removed.

Referring first to FIGS. 1, 2 and 3, a breakaway rear vision mirror assembly 10 comprises a mounting base 11 and a pivoted assembly 12. A mirror back cover 13 on the pivoted assembly 12 carries on it both a spring plate 14 which itself retains a spring 15, and also a swivel mount plate 16. The swivel mount plate 16 in turn is coupled to a mirror backing plate 17 which carries on it a mirror 18. The interconnection between the mirror backing plate 17 and the swivel mount plate 16 is by way of a spigot 19, being a part-ball outstanding from the swivel mount plate 16 which is engaged by resilient fingers 19a of a ball socket on the back of the mirror backing plate 17, this being readily "broken away" for mirror replacement for example. The break-away hinge means between the base 11 and pivoted assembly 12 comprise four projecting spigots 20 on the base 11 which engage respective sockets 21 (or other abutment surfaces) on the pivoted assembly 12.

In order to control the tilting about both vertical and horizontal axes, there is provided a tilt control lever 24, which has a T-head 23 at its inner end. The tilt control lever 24 is provided with a ball 25 which is urged into engagement with a part-spherical socket 26 in a ball boss 27 of the mounting base 11, the mounting base 11 being arranged to be secured to a panel on a motor vehicle, the panel being diagrammatically illustrated as a vehicle structure 28. The T-head 23 engages the walls of a narrow mouth channel 29 which forms a portion of the mirror backing plate 17, and as the lever 24 is moved, it either rotates the T-head 23 about the axis of the inwardly directed portion of the control lever 24, or alternatively it moves the mirror backing plate to tilt in a horizontal plane, the mirror backing plate 17 swivelling about the central axis of the part-ball 19 on the swivel mount plate 16.

With this arrangement, if the tilt control lever 24 has its ball 25 placed into firm engagement with the part-spherical socket 26 in the lever ball boss 27, the stiffness of the tilt control lever 24 will add to the resilient mount stiffness, and cause the mirror to remain in a stable position notwithstanding differences of temperature. This is achieved by spring 15 being U-shaped and extending around a spring retaining surface comprised by a track 30 (FIG. 3) in the spring plate 14, the ends 31 of the spring 15 hooking over hook ends of a U-shaped saddle 32 (FIGS. 1, 2 and 3), the saddle 32 passing through a recess 33 in the ball 25, the recess 33 having two surfaces defining a "knife edges" 34 engaging the saddle 32 to enable the lever to both rotate and tilt with respect to the mounting base 11. Pressure due to stretch of the spring 15 is thereby imparted on the rubbing surfaces of the lever ball 25 and the part-ball spigot 19, and this in turn provides a frictional resistance which is unlikely to vary by any excessive amount due to temperature changes for example.

Figure 5:
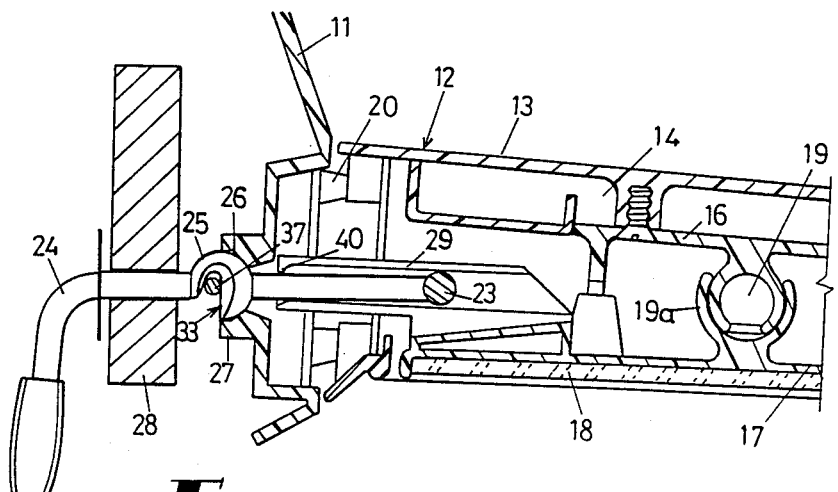
FIG. 5 is a section taken on line 5—5 of FIG. 4.
Figure 4:
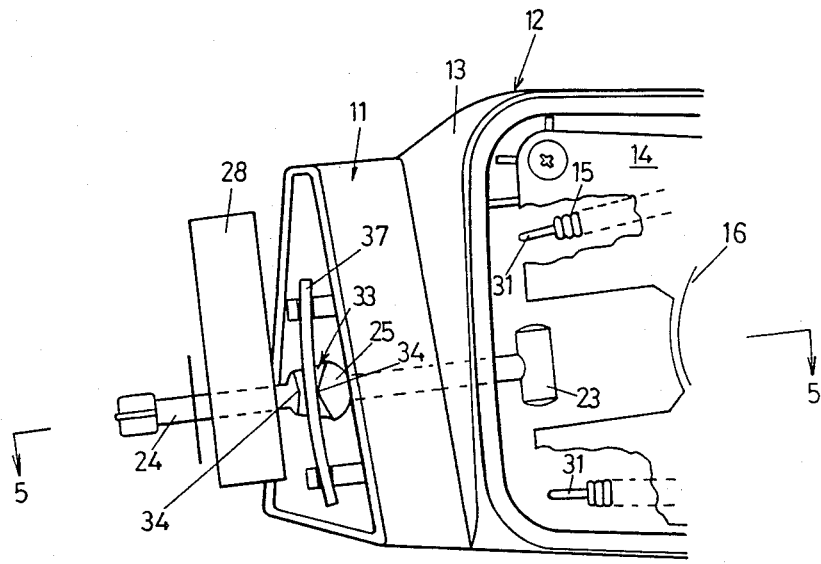
FIG. 4 is a view corresponding to FIG. 1 but showing a second embodiment.

The saddle need not necessarily be a U-shaped member, and the second embodiment of FIGS. 4, 5 and 6 indicates a saddle 37 which is merely a straight stiff rod which is engaged by the ends of the spring 15, but in other respects is similar to the first embodiment. Obviously a straight saddle is preferred, but difficult to achieve in most instances.

In both instances, the T-head 23 of the tilt control lever 24 is retained by a narrow mouth of the channel 29 and also by inwardly directed nibs 40 at the end of the channel 29 closest to the ball 25.

The embellishments 41 are used in some instances to improve the appearance of the mounting frame securing means (not shown).

I claim:

1. A breakaway rear vision mirror assembly comprising a mounting base and a pivoted assembly,
    hinge means between the base and pivoted assembly which are releasable to allow the pivoted assembly to breakaway in both fore and aft directions,
    a boss on the base assembly containing a socket, and
    a tilt control lever having a ball intermediate its ends and containing a recess, a saddle extending through the recess,
    a spring extending around a spring retaining surface in the pivoted assembly and having its two ends engaging ends of the saddle so as to firmly urge the ball against the socket walls,
    the pivoted assembly comprising a mirror, a mirror backing plate carrying the mirror, and a channel on the mirror backing plate the walls of which are engaged by an end of the control lever so as to adjust the mirror position in response to control lever movement.

2. A breakaway rear vision mirror assembly according to claim 1 wherein said channel is a narrow mouth channel having nibs at one end between which the lever extends, said lever end which engages the channel being a T-head.

3. A breakaway rear vision mirror according to claim 1 wherein said pivoted assembly comprises a spigot projecting into a socket on the mirror backing plate, at least one the spigot wall and the socket walls being part spherical in shape such that the mirror can pivot in both horizontal and vertical planes.

4. A breakaway rear vision mirror assembly comprising
    a mounting base and a pivoted assembly,
    interengaging but releasable hinge means between the base and pivoted assembly,
    the mounting base comprising surfaces defining a socket, a tilt control level comprising a ball intermediate its ends movable in that socket in both vertical and horizontal planes, said ball having walls defining a recess and engaging a saddle, said spring being coupled by the saddle to the ball,
    the pivoted assembly comprising a mirror, a mirror backing plate carrying the mirror being adjustable for position, and having means engaged by an end of the tilt control level to adjust the mirror position in response to control lever movement, and
    a spring so co-acting between the pivoted assembly and the control lever as to urge the hinge means into engagement.

* * * * *

UNITED STATES PATENT AND TRADEMARK OFFICE
CERTIFICATE OF CORRECTION

PATENT NO. : 4,867,409
DATED : SEPTEMBER 19, 1989
INVENTOR(S) : GARRY GL FIMERI

It is certified that error appears in the above-indentified patent and that said Letters Patent is hereby corrected as shown below:

In column 4, line 33 (Claim 4), please change "said" to -- a --;

line 40, please change "a" to -- said --.

Signed and Sealed this

Twentieth Day of February, 1996

Attest:

BRUCE LEHMAN

Attesting Officer  Commissioner of Patents and Trademarks